Feb. 19, 1924.

N. R. MOORE 1,484,522

HABITABLE CAMPING VEHICLE

Filed March 1, 1922     4 Sheets-Sheet 1

WITNESSES

INVENTOR
Ninian R. Moore
By Green and McCallister
His Attorneys

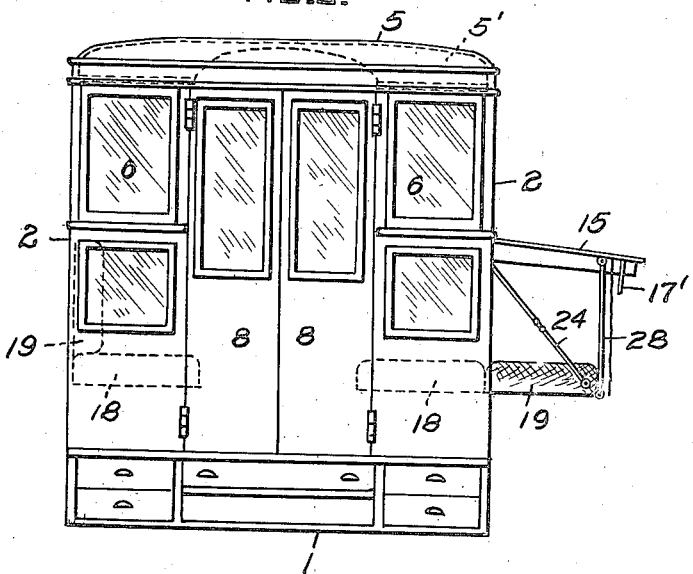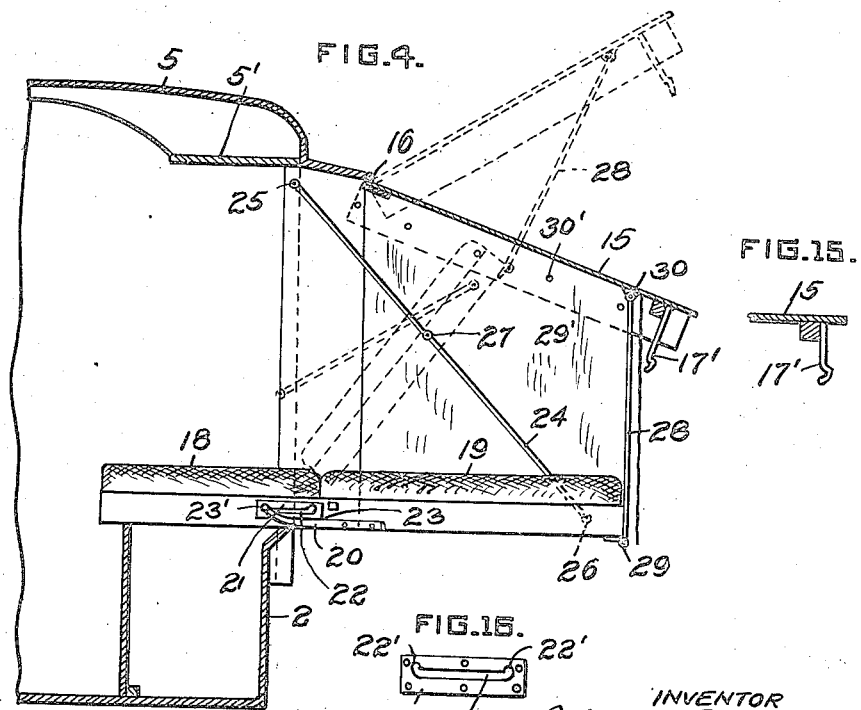

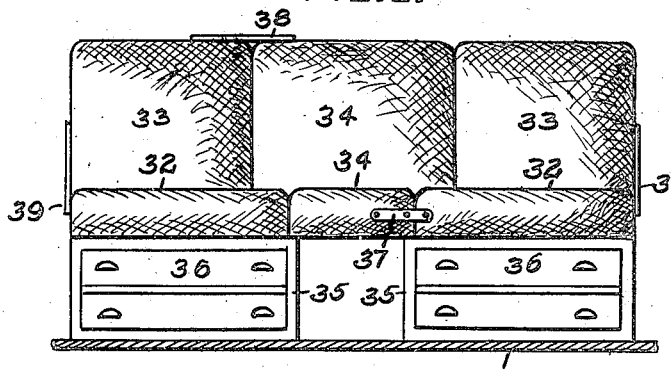
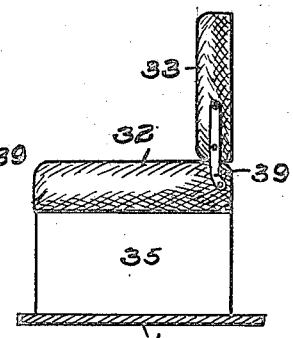
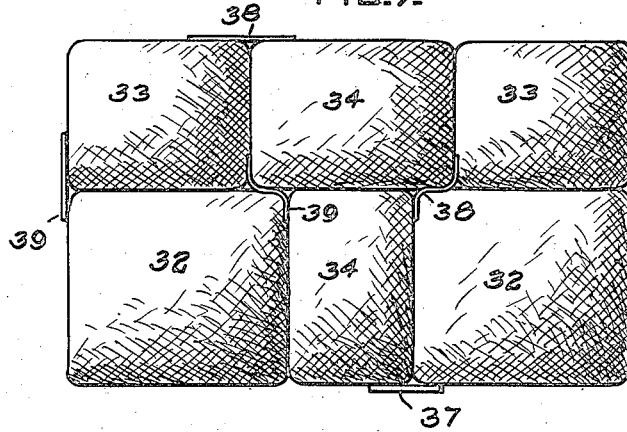
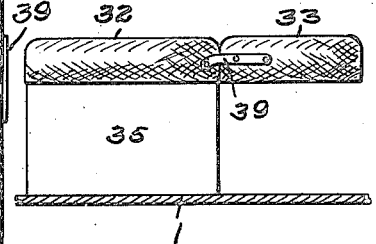
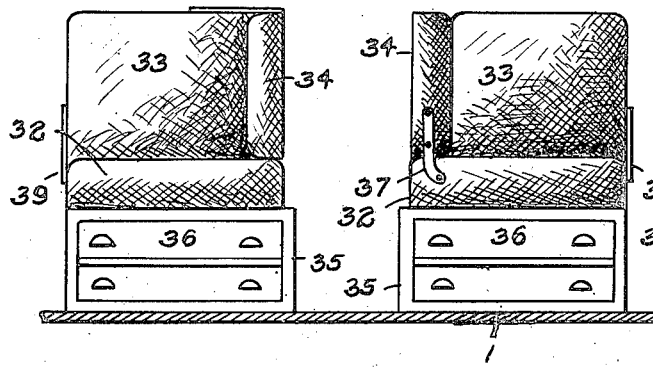
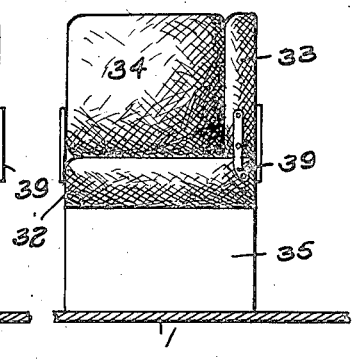

Feb. 19, 1924.  
N. R. MOORE  
HABITABLE CAMPING VEHICLE  
Filed March 1, 1922  4 Sheets-Sheet 4  
1,484,522
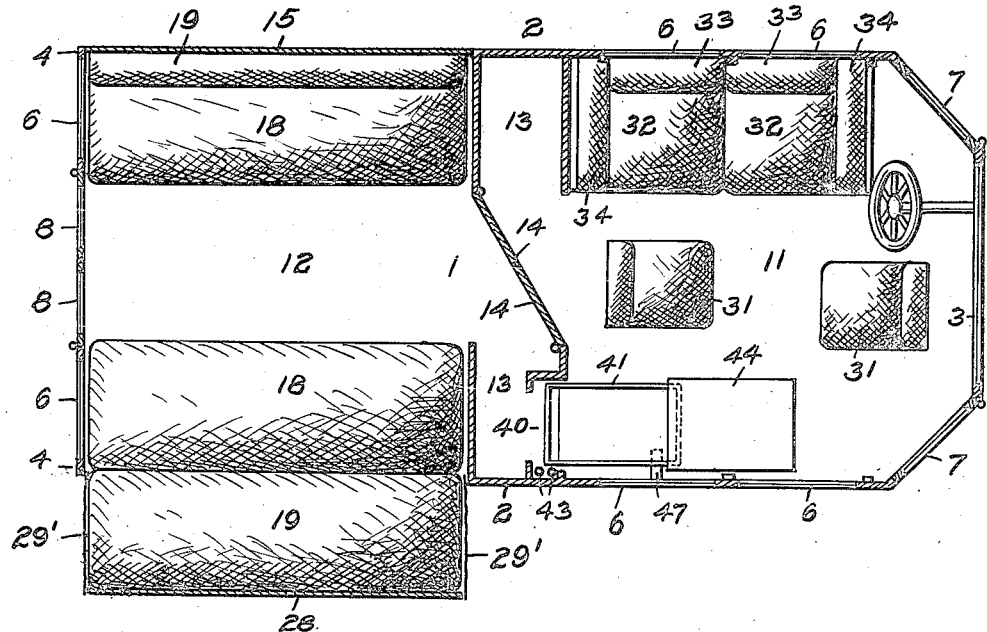
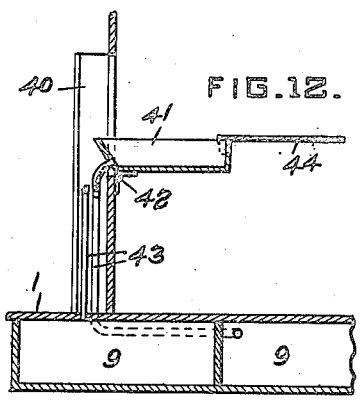
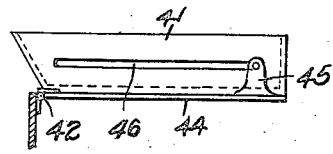
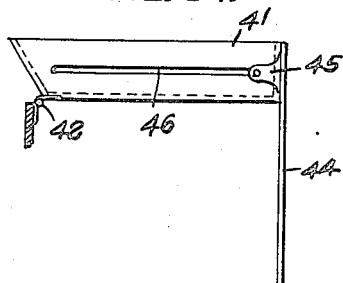

Patented Feb. 19, 1924.

1,484,522

UNITED STATES PATENT OFFICE.

NINIAN R. MOORE, OF DUBOIS, PENNSYLVANIA.

HABITABLE CAMPING VEHICLE.

Application filed March 1, 1922. Serial No. 540,148.

*To all whom it may concern:*

Be it known that I, NINIAN R. MOORE, a citizen of the United States, and a resident of Dubois, in the county of Clearfield and the State of Pennsylvania, have made a new and useful Invention in Habitable Camping Vehicle, of which the following is a specification.

The invention relates to habitable vehicles and it has particular relation to vehicles of the character described employed for camping purposes and by tourists.

One of the objects of the invention is to provide a vehicle, of the character described, having a plurality of oppositely disposed longitudinally extending seats or couches arranged along each side of the vehicle, each of which is provided with a movable back which is so connected to an outwardly hinged portion of the adjacent side wall of the vehicle body, that when the same is raised the back of the couch will be simultaneously and automatically lowered to a substantially horizontal position to provide a sleeping bed which will support the hinged portion of the side wall in a raised position to provide a roof or canopy extending over the bed, and side wall therefor.

Another object of the invention is to provide a vehicle, of the character designated, having a plurality of seats arranged in spaced relation with respect to each other to provide a passageway therebetween and so constructed that the sides and backs thereof may be folded down in such manner as to co-operate with each other to provide an additional sleeping bed.

A further object of the invention is to provide a vehicle, of the character set forth, having a plurality of oppositely disposed cupboards or wardrobes the doors of which may be partially opened to co-operate with each other to provide a diagonally extending wall or partition which divides the interior of the vehicle into a plurality of separate and independent habitable compartments or chambers, each of which communicate with one of the cupboards.

A still further object of the invention is to provide a vehicle of the character described provided with a sink or wash basin which may be collapsed or folded into a relatively small space when not in use.

Another object of the invention is to provide a vehicle of the character described having a plurality of shelves and storage compartments arranged in convenient locations.

With such objects in view, as well as other advantages which may be incident to the utilization of the improvement, the invention consists in the parts and combinations thereof hereinafter set forth and claimed, with the understanding that the several necessary elements constituting the same may be varied in proportion and arrangement without departing from the nature and scope of the invention.

In order to make the invention more clearly understood, means are shown in the accompanying drawings for carrying the same into practical effect, without limiting the improvements, in their useful applications, to the particular constructions, which, for the purpose of explanation, are made the subject of illustration.

In the accompanying drawings:—

Fig. 3 is an end view in elevation of a camping vehicle constructed in accordance with this invention.

Figure 4 is a fragmentary transverse sectional view of a camping vehicle illustrating another embodiment of the invention.

Figure 5 is a front elevational view of the convertible seat and bed structure with the sides thereof arranged to form a seat extending entirely across the body of the vehicle.

Figure 6 is an end view of the structure illustrated in Fig. 5.

Figure 7 is a plan view of the structure illustrated in Fig. 5 with the sides and backs thereof folded down to form a couch or bed.

Figure 8 is an end view of the structure in the position illustrated in Fig. 7.

Figure 9 is a front elevational view of the convertible seat and bed structure with the sides and backs folded to form two separate and independent seats with a passageway extending therebetween.

Figure 10 is an end view of the structure with the parts in the position illustrated in Fig. 9.

Figure 11 is a horizontal sectional view through the body portion of the vehicle and illustrating the arrangement of the seats when the collapsible sink is opened out for use.

Figure 12 is a fragmentary vertical sectional view of the sink opened out in position for use.

Figure 13 is a detailed view on a larger scale of the sink in a horizontal position but with the drain board in folded position.

Figure 14 is a view similar to Fig. 13 but with the drain board partially opened up.

Figure 15 is a detailed view of one of the latch members for maintaining the movable side walls of the vehicle in closed position.

Figure 16 is a detailed view of the slotted portion of one of the hinges.

Figure 1:
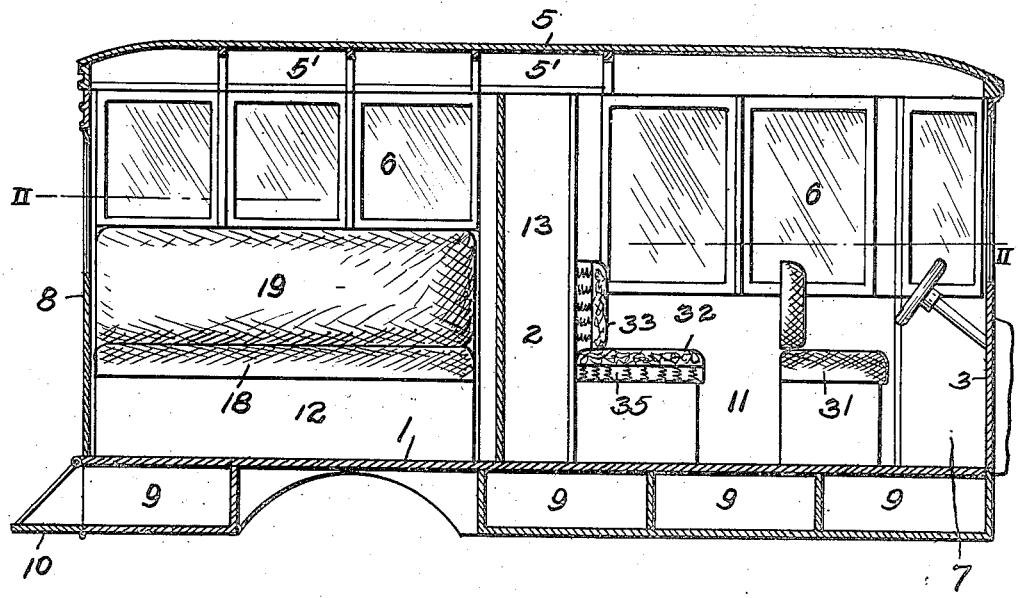
Figure 1 is a vertical longitudinal sectional view through the body portion of a camping vehicle constructed in accordance with the invention.
Figure 2:
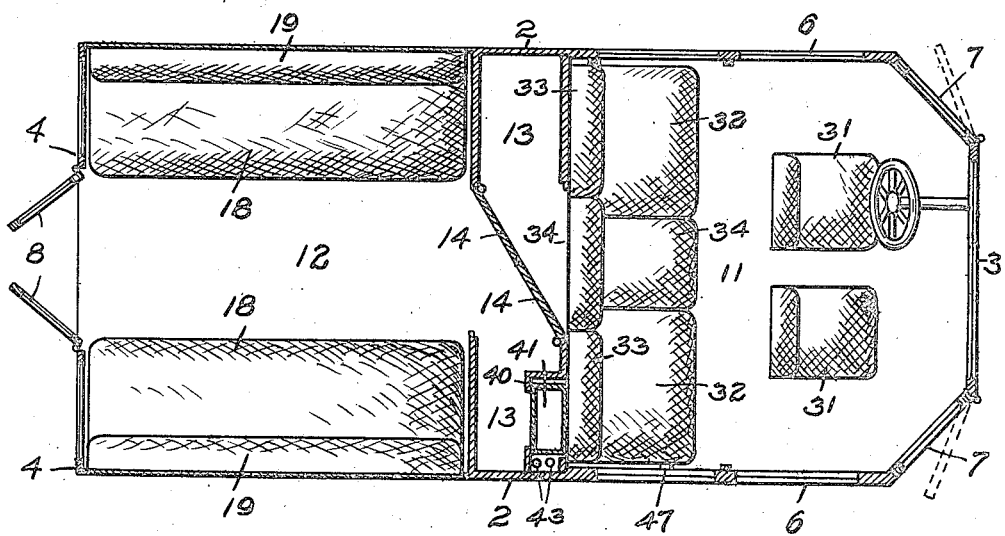
Fig. 2 is a horizontal sectional view of the camping vehicle taken on line II—II of Fig. 1.

Referring to the drawings, the body portion of an enclosed camping vehicle is illustrated as comprising a floor 1, side walls 2, front and rear end walls 3 and 4 respectively, and a roof 5. The side and end walls 2 are preferably provided with a plurality of windows 6. Access to the interior of the vehicle is provided for through diagonally disposed doors 7, adjacent to the front wall 3 and by means of doors 8 provided in the rear wall 4.

A plurality of storage compartments 9 are provided beneath the floor 1, the rearmost of which is provided with a door 10 which also constitutes a step to facilitate entry through the rear doors 8. A plurality of shelves 5' are provided adjacent to the roof 5 and furnish additional storage space.

The interior of the vehicle is divided into forward and rear compartments or chambers 11 and 12 respectively, by means of two oppositely disposed cupboards or wardrobes 13 arranged at substantially the middle of the body of the vehicle. The cupboards 13 are provided with doors 14 which are of such dimensions and so mounted that when they are both partially open, the outer vertical edges thereof will abut each other and together constitute a transverse wall or partition separating the compartments 11 and 12, but with each of the compartments in communication with one of the cupboards 13. If desired, the cupboards 13 may be provided with collapsible wash basins or sinks 14.

The rear compartment 12 is also provided with two oppositely disposed couches or seats 18 which extend longitudinally along the sides of the compartments and which are provided with movable backs 19. Each of the backs 19 is preferably hinged to the adjacent seat 18 by means of a sliding pivotal connection indicated as a whole by the numeral 20 and by means of which the back 19 may be lowered to a substantially horizontal position when the adjacent panel 15 is raised as is best illustrated in Figs. 3 and 4. The pivotal connection 20 comprises a member 21 secured to the seat 18 and which is provided with a slot 22 having a notch 22' at each end thereof. A curved member 23 is secured to the back 19 and is provided with a projection or lug 23' which is adapted to slidably engage the slot 22. When the back 19 occupies a horizontal position, the projection 23' engages the innermost notch 22' of the slot 22 and prevents any movement of the back 19 toward or away from the seat 18. When, however, the back 19 is raised slightly, the projection 23' is automatically disengaged from the inner notch 22' thereby permitting the back 19 to be moved in an outwardly direction sufficiently to clear the outer edge of the seat 18 in order that it may be raised to its vertical position. The back may be then moved bodily inwardly, with the projection 23' riding in the transverse portion of the slot 22, to provide clearance for the panel 15 to be closed.

The back 19 is supported in its horizontal position by means of struts or linkage mechanism 24 which are pivotally connected at their upper extremities to the side wall 2 of the vehicle body as at 25, and which extend outwardly and downwardly and are pivotally connected to the back 19 adjacent to the outer edge thereof as at 26. Each of the struts 24 is jointed at its middle as indicated at 27, to permit the back 19 to be folded to its vertical position.

The panel 15 is also supported in a raised position, when the back 19 occupies a horizontal position to provide a roof or canopy therefor by means of a panel 28 which is pivotally connected to the back 19 at 29 and to the outer edge of the panel 15 at 30. When the parts occupy the position described to provide a sleeping bed, the curtains 29' may be suspended from buttons 30' adjacent to the head and foot of the bed and which together with the panel 28 entirely enclose the same.

From the foregoing, it will be apparent, that when it is desired to lower the backs 19 of the seats 18 to convert them into sleeping beds, the latches 17' are released and the panels 15 are raised. The outwardly and upward swinging movement of the panel 15 causes the panel 28 to swing the back 19 from its vertical position, outwardly to a position from which it may drop, under the action of gravity, until its movement is arrested by the struts 24.

When the back is folded from its horizontal to its vertical position, the panel 15 is first raised to the position indicated by the dotted lines in Fig. 4. The back 19 may be then moved across the dead center line, defined by the panel 28 and the plane of the back 19, and the folding movement of the various parts completed by lowering the panel 15. By this construction, the folding and unfolding of the sleeping bed is accomplished with a minimum of time and effort.

The forward compartment 11 of the vehicle body is provided with a plurality of seats 31, one of which may be occupied by the operator when the vehicle is being driven. To the rear of the seat 31 and adjacent to the cupboards 13 are two additional seats 32 which are spaced from each other laterally and which are provided with movable backs and sides 33 and 34 respectively. A case or cabinet 35 may be provided beneath the seats 32 containing a plurality of drawers 36 adapted to be employed for storage purposes, and which are slidably mounted upon the floor of the vehicle for a purpose presently to be described.

One of the arms or sides 34 is pivotally mounted on a seat 32 for vertical swing movement by means of a hinge connection 37 and is adapted to be swung downwardly to a horizontal position to bridge the space between the seats 32 and form one continuous seat extending entirely across the vehicle. The other side 34 is pivotally mounted upon the back 33, of its respective seat, for horizontal swinging movement by means of hinge connections 38 and may be consequently moved to a transverse position and in alignment with the backs 33 to form one continuous back. (Figs. 5 and 6.)

The backs 33 are hinged to the seats 32 for vertical swinging movement by means of hinges 39 and may swing downwardly together with their co-operating side 34 to a substantially horizontal position (Figs. 7 and 8) to form a sleeping bed, by first sliding the seats 32 and their supporting cabinets 35 in a forward direction.

One of the cupboards 13 is provided with a compartment 40 to one of the walls of which a collapsible sink 41 is hinged, as indicated at 42, and which may be folded upwardly and into the compartment when not in use. Hot and cold water may be supplied to the sink 41 by means of pipes 43 from suitable tanks, not shown, disposed in the compartments 9 beneath the floor of the vehicle.

The sink 41 is provided with a folding drain board 44 which is supported thereon by means of brackets 45 which slidably engage channels 46 provided on the sides of the sink. When it is desired to use the sink, the same is swung outwardly and downwardly out of the compartment 40 into a horizontal position and into engagement with a supporting bracket 47 mounted on the adjacent side wall of the vehicle. If it is desired, the drain board, which is folded against the bottom of the sink when not in use, as illustrated in Fig. 13, is swung downwardly and then upwardly around the end of the sink to a horizontal position illustrated in Figs. 11 and 12. The drain board 44 may be slid horizontally over the sink, if it is desired to employ the sink as a table or shelf; when the drain board is thus moved the brackets 45 slide in the channels 46.

When the sink is employed, the seats 31 and 32, which are movable as previously described, may be arranged as shown in Fig. 11 to provide ample floor space.

From the foregoing it will be apparent that a camping vehicle is provided in which the various seats occupy but small space and are quickly and easily convertible into sleeping beds without materially reducing the floor space of the vehicle. Furthermore, the vehicle is provided with numerous compartments which afford ample storage space.

What I claim as my invention is:

1. A camping vehicle having a movable side wall, a seat disposed in said vehicle, a movable back mounted on said seat and linkage mechanism connecting said back to said side wall.

2. A camping vehicle having a movable side wall, a seat disposed in said vehicle, a movable back mounted on said seat, and linkage mechanism connecting said back and said side wall to cause the same to move in unison.

3. A camping vehicle having a movable side wall, a seat disposed in said vehicle, a back mounted upon said seat and movable to a substantially horizontal position to provide a bed, linkage mechanism for supporting said back in its horizontal position and a panel connecting said back to said side wall to maintain the same in extended position over said bed.

4. A camping vehicle having a side wall adapted to be swung in an outward direction, a seat disposed in said vehicle, a back hinged thereto and adapted to be swung outwardly to a substantially horizontal position to provide a sleeping bed, means for supporting said back in its horizontal position and means connecting said back and said side wall to support said side wall over said back when said back occupies a horizontal position and to raise said back when said side wall is raised.

5. A camping vehicle having a side wall adapted to be swung in an outward and upward direction, a seat disposed in said vehicle, a back hinged thereto and adapted to be swung in an outward and downward direction to provide a sleeping bed, means for supporting said back in a substantially horizontal position, and means connecting said back and said side wall whereby said back is moved outwardly and downwardly when said side wall is raised.

6. A camping vehicle having a side wall adapted to be swung in an outward and upward direction, a seat disposed in said vehicle, a back hinged thereto and adapted to be swung in an outward and downward direction to provide a sleeping bed and means connecting said back and said side wall whereby the movement of said side wall will cause the movement of said back.

7. A camping vehicle having a body portion, a foldable sleeping bed disposed therein and having a portion adapted to be folded into a horizontal position, a panel movably mounted on the side wall of said vehicle and adapted to be moved to a position over said bed to form a roof therefor, means for supporting said panel over said bed and means connecting said bed and said panel to move said panel out of the path of said bed when the bed is unfolded and folded.

8. A camping vehicle comprising a body portion, a plurality of seats disposed therein and provided with a bottom, back and side portions, one of said side portions being hinged to the bottom portion of one of said seats and the other of said side portions being hinged to the back portion of the other of said seats, said back and side portions being adapted to be moved to horizontal positions and to co-operate with each other to form a sleeping bed.

9. A camping vehicle comprising a body portion, a plurality of seats disposed therein and arranged in side-by-side spaced relation with respect to each other, each of said sides being provided with a back and side adapted to be moved to horizontal positions, one of said sides being adapted to bridge the space between said seats and the other of said sides being adapted to bridge the space between said backs to provide a continuous sleeping bed.

10. A camping vehicle comprising a body portion, a plurality of seats disposed therein and arranged in side by side spaced relation with respect to each other and provided with backs, and a side for one of said seats adapted to be moved to a transverse position and in alignment with said backs to form a continuous back for both of said seats.

11. A camping vehicle comprising a body portion, a plurality of seats disposed therein and arranged in side by side spaced relation with respect to each other, each of said seats being provided with a movable back and side, one of said sides being adapted to be moved to a horizontal position to bridge the space between said seats and the other of said sides being adapted to be moved to a transverse position and in alignment with said backs, to convert said seats into a single seat.

12. A camping vehicle comprising a body portion, a plurality of seats disposed therein and arranged in side by side spaced relation with respect to each other, each of said seats having a movable back and side, one of said sides being adapted to be moved to a horizontal position to bridge the space between said seats and to co-operate therewith to form a single seat and the other of said sides being adapted to be moved to a transverse position and in alignment with said backs and to co-operate therewith to form a single back, said backs and side being adapted to be all moved to a horizontal position in alignment and in substantially the same plane with said seats to form a sleeping bed.

13. A camping vehicle provided with a cabinet, a sink movably mounted therein and adapted to be swung out of the same and into a horizontal position and drain board movably mounted on said sink and adapted to be folded thereagainst when the sink is folded into said cabinet.

14. A camping vehicle provided with a cabinet, a sink movably mounted therein and adapted to be swung out of the same into a horizontal position, a drain board slidably mounted on said sink and adapted to be moved to a horizontal position over the same to provide a table.

In testimony whereof, I have hereunto subscribed my name this 16th day of February, 1922.

NINIAN R. MOORE.